July 28, 1970  H. S. JONES  3,521,947
RELIEF PHOTOGRAPH CAMERA CONSTRUCTION
Filed June 27, 1967  2 Sheets-Sheet 1
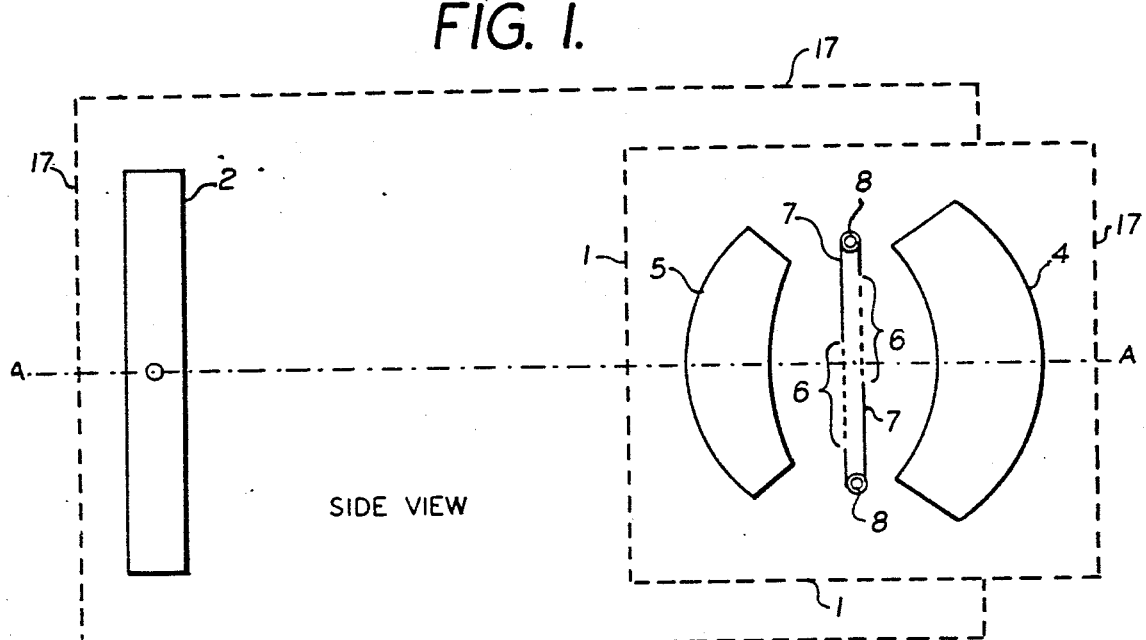
FIG. 1.
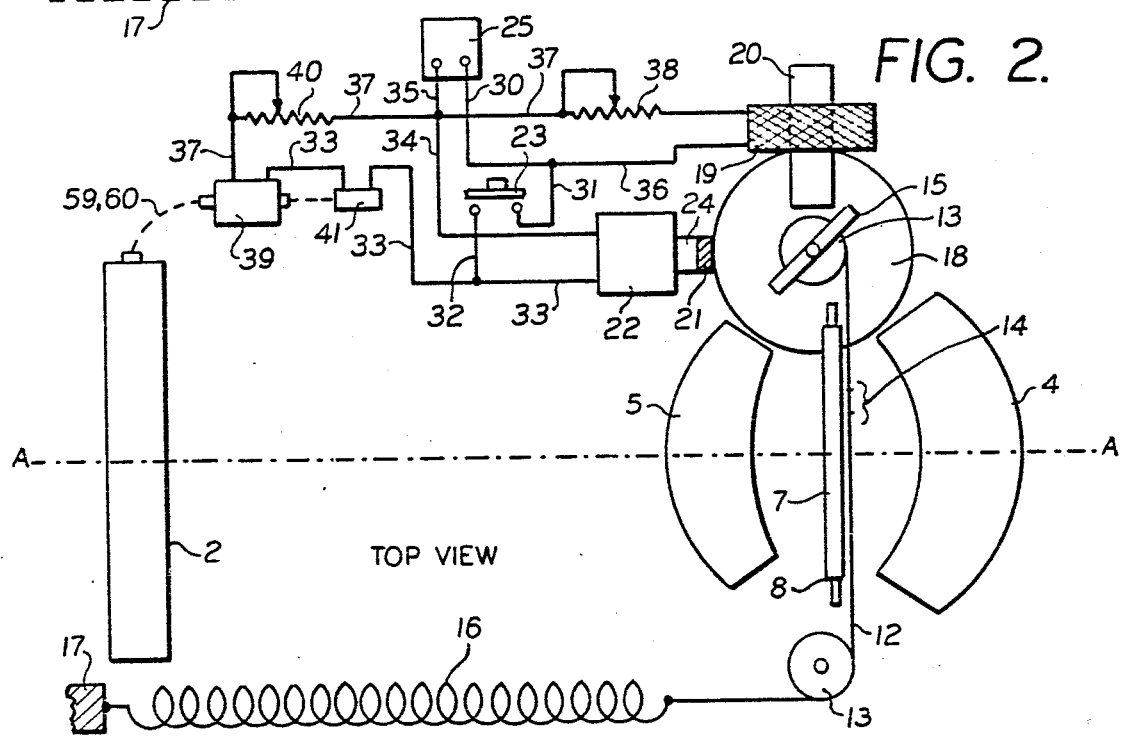
FIG. 2.
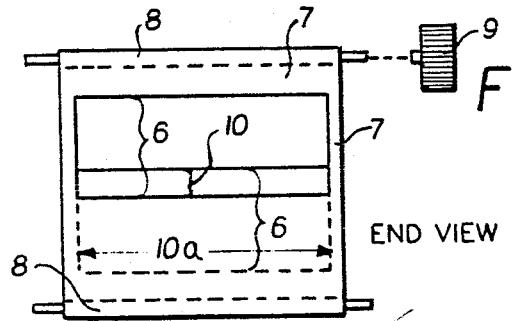
FIG. IA.
INVENTOR
HARRY S. JONES
BY
ATTORNEY.

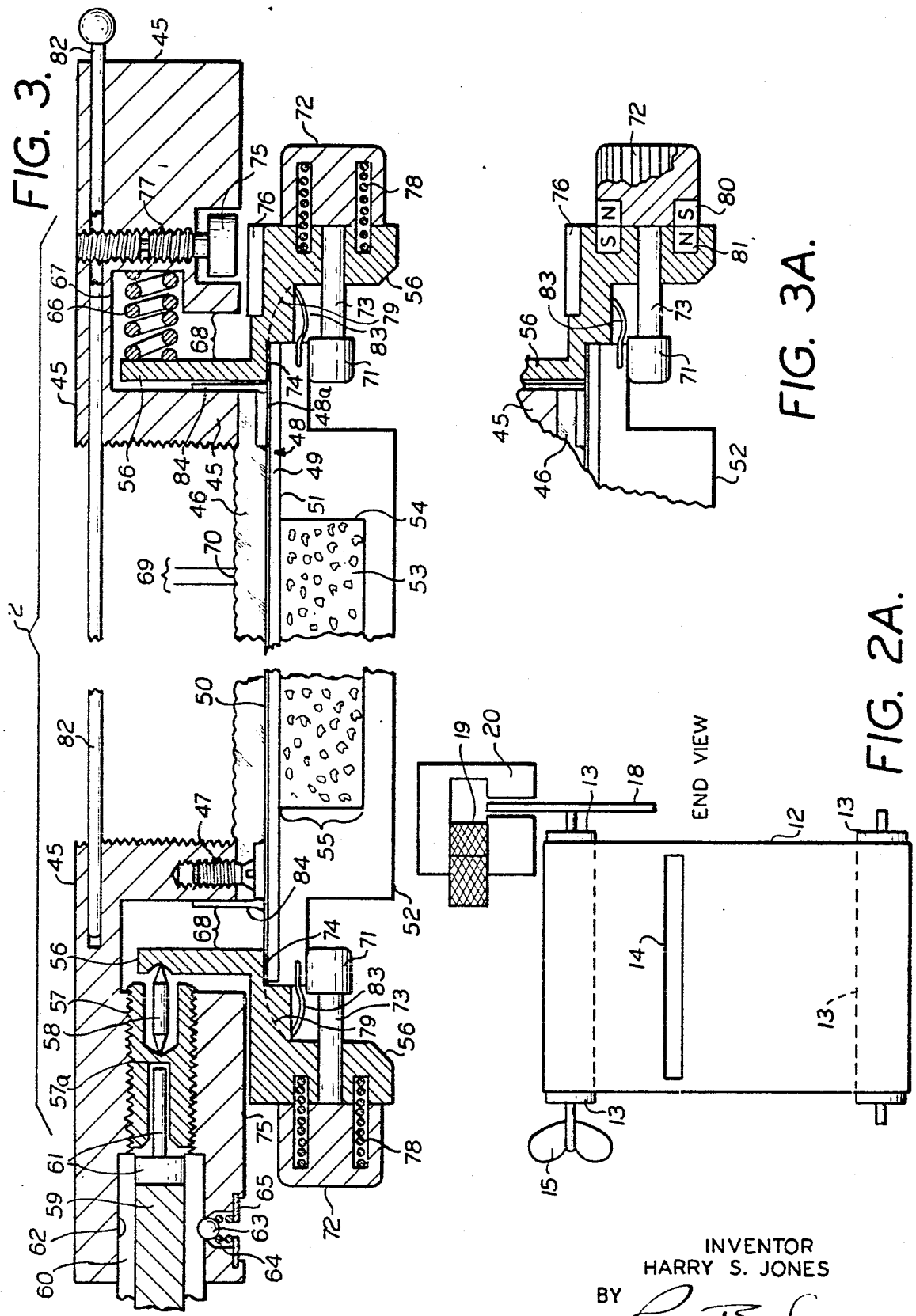

United States Patent Office 3,521,947
Patented July 28, 1970

3,521,947
RELIEF PHOTOGRAPH CAMERA CONSTRUCTION
Harry S. Jones, Monmouth Beach, N.J., assignor to Chrom-Tronics, Inc., New York, N.Y., a corporation of New York
Filed June 27, 1967, Ser. No. 649,306
Int. Cl. G03b 35/00
U.S. Cl. 352—58    14 Claims

ABSTRACT OF THE DISCLOSURE

Camera apparatus for securing normal three-dimensional photographic images wherein a portion of the aperture of a relatively large lens is traversed by a relatively small scanning aperture coincident with effecting displacement between the film emulsion and an adjacent fixed multi-element lens overlay to effect deposition of the scanned images on the photosensitive film through said multi-element lens overlay.

---

This invention relates to relief photography and more particularly to an improved camera construction for securing relief photographic images.

The obtaining of relief or three-dimensional images or effects in the photographic arts has, for many years, challenged the skilled workers in this field. While the basic theory and the nature of the problems involved have long been known and understood, the present day dearth of simple, commercially practical and inexpensive relief photographs and methods of obtaining the same cogently demonstrate the continued inability of the art to solve the problems involved.

The prior efforts in this field reveal both simple and complicated systems having various advantages and limitations and are broadly divisible into three general classes. The first of these involves the taking of two photographs of a subject using one or two camera lenses located at two different positions relative to the subject. Such photographs are usually referred to as a stereo pair.

The second class obtains the relief effect essentially by the taking, through a single lens, of a continuous series of photographs of the subject; as viewed from a continuous series positions and recording the series through an array of very small auxiliary lenses or apertures located intermediate the lens and the photographic film plane so that an image of the singe lens aperture is focused upon the film by each of such auxiliary lenses or apertures. The third broad class involves the use of a lens usually of large diameter, in association with a grating or lenticular system disposed intermediate the objective and the film plane.

Simple forms of the first class of apparatus delineated above involve old and well known techniques which were utilized in the familiar "stereoscope." The second class of apparatus, although comprehensively disclosed in the patented art, has not as yet been widely used due to the difficulties encountered in meeting the degree of precision and control required in effecting relative motion between the film and auxiliary lens array while the camera lens shutter is open while a concomitant necessary relative motion occurs between the camera and subject being photographed. In addition to the mechanical difficulties encountered, the conventionally employed expedient of effecting relative motion between the lens array and the film by tilting the film inherently results in a progressively increasing degree of defocusing for images located increasingly distant from the vertical tilt axis. The third class of apparatus avoids the problems inherent in such relative motion but, without the inclusion of complicated and usually expensive means of limited effectiveness for effecting image manipulation and inversion, produces an abnormal image in one or more particulars.

This invention may be briefly described as an improved camera construction for securing relief photographic images and which, in its broad aspects, includes traverse scanning of a portion of the aperture of a large aperture camera lens while effecting concomitant relative motion between the film emulsion and an adjacent multi-element lens overlay at a predetermined rate relative to said scanning traverse of said aperture. In more narrow aspects the subject includes means for horizontally scanning a portion of the camera lens aperture by a smaller scanning aperture while the film is simultaneously moved under a single cylindrical lens array that is disposed closely adjacent to the film and fixed relative to the camera lens and camera body. As the small aperture is scanned horizontally in one direction relative to the camera body the film is moved in the opposite direction relative to the camera body during exposure. In the subject construction the focal distance of the camera lens, the width of the camera lens scan and the $f/$ number of the elements of the cylindrical lens array are preselected so that the image of the small scanning aperture formed on the film emulsion by the cylindrical lens array moves a distance equal to the width of each cylindrical lens element and the film is then moved relative to the cylindrical lens array by a distance equal to double the width of each cylindrical lens element. By such double distance displacement, normal as distinguished from abnormal relief images are directly exposed on the film emulsion.

As used herein an "abnormal" relief or three-dimensional image is one in which the left side of the subject (relative to the viewer's left hand) is increasingly revealed as the viewer's head is moved to the right in contradistinction to a "normal" relief image wherein, as the viewer's head is moved to the right, the right side of the subject is increasingly revealed.

Among the advantages of the subject construction is the provision of a relatively inexpensive self-contained camera construction for securing relief photographic images that does not require relative motion between the camera and subject and which is capable of selectively producing a wide variation of the amount or degree of relief effect desired.

The object of this invention is the provision of an improved camera apparatus for securing relief photographs.

Other objects and advantages of this invention will be apparent from the following portions of this specification and from the accompanying drawings which illustrate the principles of this invention as incorporated in a presently preferred embodiment thereof.

Referring to the drawings:

FIG. 1 is a diagrammatic and schematic side view representation of apparatus elements utilizable in a camera construction to secure relief photographic images in accordance with the principles of this invention.

FIG. 1A is a fragmentary axial end view of the curtain assembly illustrated in FIG. 1.

FIG. 2 is a diagrammatic and schematic top view representation of the apparatus elements of FIG. 1.

FIG. 2A is a fragmentary axial end view of the exposure curtain illustrated in FIG. 2.

FIG. 3 is an enlarged diagrammatic view in section of a preferred construction of a film holder assembly utilizable in the camera apparatus of FIGS. 1 and 2.

FIG. 3A is a fragmentary view showing a modification of a portion of the film holder shown in FIG. 3.

In its broad aspects, the subject camera construction employs a single large aperture lens assembly, a scanning shutter assembly adapted to unidirectionally traverse the full aperture of the camera lens together with an associated image receptor assembly including means for effecting synchronized and controlled relative motion between the film and an adjacent lens overlay while the lens aperture is being traversed by the scanning shutter.

Referring now to FIGS. 1, 1A, 2 and 2A, there is provided a large aperture lens assembly incorporated within the dotted lines 1 and which forms its image of a three-dimensional subject being photographed upon a remotely-located film holder assembly generally designated 2 of a construction to be hereinafter described in detail. The lens assembly 1 may contain front and rear lens elements 4 and 5 which may themselves be compositely formed of one or more lenses. Disposed close to the stop plane of lens 1 is a horizontal aperture 10 formed by the overlap of two rectangular openings 6 in an endless flexible curtain 7 which is carried upon a pair of spaced rollers 8. The rollers 8 are adapted to be rotated by a knob 9 coupled by any suitable means to either roller 8 and by means thereof the width 10 of horizontal aperture 10 may be varied as desired.

FIGS. 2 and 2A more clearly illustrate the other components of the camera construction in combination with those heretofore described. Close to horizontal aperture 10 and the stop plane of lens 1 is a second flexible curtain 12. The curtain 12 is supported transverse to curtain 7 by a pair of spaced rollers 13 and contains a vertical shutter slot 14 similar to the slot in a conventional focal plane shutter. By means of a key handle 15 or other suitable means, the curtain 12 may be wound upon one roller 13 by counterclockwise key rotation against the biasing tension of a spring 16 attached to the camera body 17. Also attached to the roller 13 mounting the key handle 15 thereon is a thin conducting disc 18 of copper or other material of high electrical conductivity. The speed of rotation of disc 18, rollers 13 and, hence, the speed of horizontal traverse of vertical slot 14 is controlled by the current in a coil 19 via magnetic field pole structure 20 having an air gap through which disc 18 moves when driven by spring 16 when the spring is contracted to advance the curtain 12.

In practice, the vertical slot 14 may be "cocked" for a photographic exposure, that is, slot 14 may be moved to the right toward key handle 15 by convolute winding of the curtain 12 on the right-hand roller 13 through counterclockwise manual rotation of key handle 15 against the electro-magnetic drag produced on disc 18 by coil 19 and associated field structure 20 and also against the frictional drag induced by a brake shoe 21 normally biased into frictional engagement with the disc 18 by a spring, not shown. A solenoid 22 serves, when energized, to remove the brake shoe 21 from braking engagement with the disc 18. More specifically, when energized by closure of a normally-open pushbutton switch 23 solenoid 22 withdraws its armature 24 and brake shoe 21 so that disc 18 is free to turn under the tension of spring 16. Power is furnished to solenoid 22 by power source 25 via conductors 30, 31, switch 23, and conductors 32, 33, 34 and 35. Power is also continuously supplied by source 25 to coil 19 via conductors 30, 36, 37, rheostat 38 and conductor 35.

The film in film holder 2 is moved simultaneously with the movement of lens-scanning aperture 14 but in the opposite direction by motor 39, the shaft of which is coupled to film holder 2 by any suitable means, for example, by a flexible shaft. Motor 39 is furnished power by source 25 via conductors 35, 37, rheostat 40, conductors 33, motor limit switch 41 coupled to the shaft of motor 39, switch 23 and conductors 30, 31 and 32.

When using the apparatus described above, a 3-D photograph may be exposed by the following sequence. First, the scanning aperture 14 is "cocked" by turning key handle 15 counterclockwise. This would serve to locate the slot 14 at the extreme right hand end of the aperture 10 of lens 1, as shown in FIG. 1A and as seen by the subject being photographed. The 3-D photograph is exposed by pressing switch 23 until scanning aperture 14 moves across the aperture 10 to the extreme left-hand edge thereof, as viewed by the subject, while the film in holder 2 is simultaneously moved to the right a distance equal to the width of two cylindrical lens elements relative to these lens elements within the holder 2, again as viewed by the subject.

When necessary, rheostat 38 may be adjusted to vary the speed of scanning aperture 14, that is, the time of film exposure by varying the eddy-current drag upon disc 18 in a manner similar to that of a watt-hour meter. Similarly, the time taken for the film in holder 2 to move two cylindrical lens element widths may be adjusted by rheostat 40 which controls the speed of motor 39. Limit switch 41 may be adjusted to prevent film motion substantially in excess of the necessary two lens element widths. The focal distance between the film holder 2 and camera lens 1 may be determined and adjusted by any usual means. Substantially uniform motion of aperture 14 may be assured by utilizing only a small fraction of the total displacement of spring 16.

A presently preferred construction for effecting the desired movement of the film relative to a cylindrical lens overlay or array is shown in FIG. 3. As there illustrated, the main body 45 of the film holder 2 has a cylindrical lens overlay array 46 rigidly secured thereto by one or more screws 47. The emulsion side 48a of film 48 to be exposed is held against the flat undersurface 50 of lens array 46 by the flat bearing surface 51 of a backing plate 52. In some instances it may be desirable to incorporate a layer of resilient foam plastic 53 seated within a cavity 54 in backing plate 52 in order to provide a uniform gentle pressure upon the film base 49 so that the film emulsion 48a is always in extended interfacial contact with the flat undersurface 50 of lens array 46. The degree of desired pressure may be controlled both by increasing the thickness of the plastic layer 53 relative to the depth 55 of the cavity 54 and by variation of the elastically deformable and resilient characteristics of the plastic material employed.

The film 48 and backing plate 52 are mounted on a moveable frame 56 which is adapted to be linearly displaced by rotation of a screw 57 through a compression link 58. Torque for rotation of screw 57 is furnished through a flexible shaft 59 housed in a sheath 60 and flexible shaft 59 is fitted with a screw driver bit or other suitable extension 61 which engages a mating slot or recess 57a in screw 57. The flexible shaft 59, sheath 60, and bit 61 may be removed from the film holder 2 when desired by application of an axial pull thereto to disengage groove 62 on the exterior surface of sheath 60 free from a spring loaded ball 63. As shown, the ball 63 is loaded by a spring 64 retained by a washer 65 located in the main body 45. The positive displacement of frame 56 as induced by rotation of screw 57 and link 58 is effected against the opposing bias of one or more springs 66 situated in cavities 67 in film holder body portion 45. To insure a range of travel of film 48 relative to lens array 46 sufficient to accommodate displacements thereof of at least double the width 69 of each lens element 70 of lens array 46, the spring 66, screw 57 and clearance 68 between frame 56 and film holder body 45 are designed and sized to provide a permitted length of travel that is appreciably greater than the double width required.

Undesired and deleterious spurious motion at right angles to the lineal direction of advance of screw 57 and of film 48 relative to lens array 46 may be held to negligible limits by providing a smooth close clearance fit between frame 56 and the body portion 45 by means well known to those skilled in the camera art.

After film 48 and backing plate 52 have been inserted in frame 56, rotation of pressure cams 71 by means of knurled knobs 72 causes the backing plate 52 to firmly clamp the film 48 against the roughened surfaces 74 of frame 56. The amount of pressure between the backing plate 52, the film 48 and the undersurface of the lens array 46 is uniformly controlled and maintained over the entire operative face area of the film 48 by the forces engendered by the spacing intermediate permanent magnets 75 fastened to screws 77 threaded in film holder body portion 45 and magnetically-permeable plates 76 fastened to frame 56 in facing relation therewith. As will be apparent, the pressure between film 48 and the undersurface 50 of the lens array 46 may be adjusted for both magnitude and uniformity by appropriate adjustments of the screws 77 mounting the permanent magnets 75 thereon. The location of other magnet locations around frame 56 are not shown in order to simplify the FIG. 3 showing but a sufficient number will be used to insure uniform pressure application.

To simplify the loading and unloading of the film 48 in a darkroom, an auxiliary spring 78 may be provided between each knob 72 and frame 56 so that the cams 71 can be axially displaced out of engagement with the base plate 52 and to thus allow free access to the film 48. The frame 56 may also be provided with recesses 79 at various points desired to aid in the removal of film 48. The knobs 72 may, if desired and as shown in FIG. 3A, alternatively be fitted with ring type permanent magnets 80 situated adjacent to similar magnets 81 fastened to frame 56. If the position of the unlike (north and south) poles of magnets 80 and 81 are located so that they are disposed in facing relationship when cam 71 is in or close to its clamping position against plate 52, knob 72 will be held firmly against frame 56 thereby. However, when knob 72 is turned 180° to unclamp backing plate 52, the like poles of magnets 80 and 81 will be disposed in facing relation and the force of repulsion therebetween will cause cam 71 to be axially withdrawn out of engagement with the backing plate 52 to permit easy removal of film 48 and backing plate 52 from the frame 56.

In order to prevent exposure of the film 48 after loading in a dark room an opaque plate 82 is inserted in a suitable slot in the holder body portion 45 in the same manner as in a conventional film holder. In some cases however it may not be possible to prevent light from leaking between frame 56 and holder body 45, and in such instances an opaque soft flexible gasket 84 is disposed around and fastened to all sides of the cylindrical lens array and in contact with the upper surface of film 48. Similarly, opaque flexible gaskets 83 are located around and fastened to all sides of the backing plate 52 so as to press upon frame 56 and thus block possible light leakage at the edges of backing plate 56.

In the subject construction the cylindrical lens elements 70 of the lens array 46 must have a selected curvature, optical refractivity and spacing from the flat underside 50 thereof such that an image of the overlap area of the scanning aperture 14 and iris 10 is focused upon the said flat undersurface 50 and upon film emulsion 48a disposed in adjacent interfacial relationship therewith. The $f/$ number of the lens elements 70 should, preferably, be equal to the ratio of the focal distance of the lens 1 divided by the effective full linear horizontal aperture length $10a$ traversed by scanning aperture 14.

It will now be clear to those skilled in this art that the above-described construction of the film holder 2 is such as to permit handling in substantially the same manner as a conventional film holder and that when the same is coupled to motor 39 by means of flexible shaft 59 and sheath 60 it can be used to make three-dimensional photographic exposures as previously described. Of course, at the time the film holder 2 is reloaded, the drive screw 57 must be turned backward a sufficient amount to provide the necessary film travel range 68.

It will also now be clear to those skilled in this art that shutter aperture 14 and film 48 may be moved either to the right or to the left during photographic exposure as determined by the construction of the mechanism for the traverse of aperture 14 and by the means for effecting movement of the film within this film holder 2. It is likewise clear that the photographic exposure may also be varied by adjustment of the width of the horizontal aperture 10 formed by openings 6 in curtain 7 and/or by the use of other apertures similar to scanning aperture 14 in the shutter curtain 12 but which are either wider or narrower than aperture 14. Such additional scanning apertures (not shown) may be included in curtain 12 in a sequential manner similar to the construction of some conventional focal plane shutters. In addition, alternate electrical and mechanical components and designs may be used for effecting the traverse of film 48 and shutter curtain 12 without departing from the basic principles of the disclosed three-dimensional camera construction and operation.

In order to maintain substantial equality of the ratio of the focal distance of the camera lens to the width of the camera lens scan and the focal ratio or $f/$number of the elements of the lens array when substantial changes are made in the focal distance of the camera lens 1 from holder 2 the width $10a$ of aperture 10 may be trimmed to maintain such equality. This may readily be accomplished by utilizing a second adjustable aperture (not shown) similar to aperture 10 situated close to and transverse to aperture 10.

Having thus described my invention, I claim:

1. In the taking of relief photographs in a camera on a contained photosensitive film surmounted by an adjacent multi-element lens array, the steps of
   displacing a discrete portion of the aperture of the lens of said camera in a plane substantially perpendicular to the axis of said camera lens, and
   simultaneously displacing the film relative to the multi-element lens array through a distance substantially equal to the width of two adjacent lens elements thereof in a direction opposite to that of aperture displacement during the period of traverse of said aperture.

2. In the taking of relief photographs in a camera on a contained photosensitive film surmounted by an adjacent multi-element cylindrical lens overlay, the steps of
   displacing a discrete portion of the aperture of the lens of said camera in a plane substantially perpendicular to the axis of said camera lens and in a direction substantially perpendicular to the longitudinal axes of the cylindrical lens elements of said overlay, and
   simultaneously displacing the film relative to said cylindrical lens overlay through a distance substantially equal to the width of two adjacent cylindrical lens element thereof in a direction substantially perpendicular to the longitudinal axes of the said cylindrical lens elements and opposite to that of said aperture displacement during the period of traverse of said aperture.

3. The method as set forth in claim 2 wherein said aperture and said film are displaced at substantially constant rates.

4. Camera apparatus for the taking of relief photographs comprising,
   a camera body including an image forming lens and means for locating photosensitive film in operative relation therewith,
   a multi-element lens array positioned adjacent to said film and having its lens elements disposed closely adjacent to the focal plane of said image forming lens,
   means for displacing a discrete portion of the aperture of the camera lens in a plane substantially perpendicular to the axis thereof, and
   means for simultaneously displacing the film relative to the multi-element lens array through a distance substantially equal to the width of two adjacent lens elements therein in a direction opposite to that of aperture displacement during the period to traverse of said aperture.

5. The camera apparatus as set forth in claim 4 wherein said multi-element lens array is a cylindrical lens overlay, and the said portion of said aperture and the said film are displaced in a direction substantially perpendicular to the longitudinal axes of the cylindrical lens elements of said overlay.

6. Camera apparatus as set forth in claim 5 including means for varying the effective area of said discrete portion of said lens aperture.

7. Camera apparatus as set forth in claim 5 including means for controlling the limits of traverse of said discrete portion of said lens aperture.

8. Camera apparatus as set forth in claim 4 including means for synchronizing the displacement of said photosensitive film with said aperture displacing means.

9. Camera apparatus as set forth in claim 8 including means for limiting the displacement of said photosensitive film to twice the width of said individual lens elements of said lens overlay.

10. Camera apparatus as set forth in claim 4 wherein said aperture displacing means comprises
a dual adjustable curtain shutter assembly for selectively defining the horizontal and vertical extent of the aperture, and
displaceable shutter means defining a portion of said aperture for traversing the same.

11. Camera apparatus as set forth in claim 4 including means for fixedly locating said lens overlay relative to said camera body.

12. Camera apparatus as set forth in claim 11 wherein said lens overlay has a planar undersurface in combination with
means for magnetically maintaining said photosensitive film displacing means in compressive relation with the planar undersurface of said lens overlay.

13. Apparatus as set forth in claim 12 including auxiliary elastically deformable means for compressively directing said photosensitive film into interfacial engagement with said undersurface of said lens overlay.

14. Camera apparatus for the taking of relief photographs comprising
a camera body including an image forming lens and means for locating a photosensitive film in operative relation therewith,
a multi-element cylindrical lens overlay positioned adjacent to said photosensitive film and having its cylindrical lens elements disposed closely adjacent to the focal plane of said image forming lens,
a pair of displaceable overlapping apertured curtain elements disposed in transverse relation for defining the horizontal and vertical extent of a selected aperture, and
a third curtain element having a rectangular aperture therein displaceable across the selected aperture defined by said first and second curtain elements in a direction perpendicular to the longitudinal axis of said cylindrical lens elements of said lens overlay to effect exposure of desired relief data upon said photosensitive film.

References Cited

UNITED STATES PATENTS

| | | | |
|---|---|---|---|
| 1,260,682 | 3/1918 | Kanolt | 352—46 |
| 2,063,985 | 12/1936 | Coffey | 95—18 |
| 2,217,240 | 10/1940 | Stumpf | 352—46 |
| 2,318,983 | 5/1943 | Winnek. | |
| 2,562,077 | 7/1951 | Winnek | 95—18 |
| 2,622,472 | 12/1952 | Bonnet | 352—58 |
| 2,929,305 | 3/1960 | Blackstone | 352—57 X |
| 3,099,195 | 7/1963 | Goodbar. | |

FOREIGN PATENTS

| | | |
|---|---|---|
| 433,993 | 4/1948 | Italy. |
| 55,929 | 9/1952 | France. |

NORTON ANSHER, Primary Examiner

M. H. HAYES, Assistant Examiner

U.S. Cl. X.R.

352—44, 81; 95—18